United States Patent [19]

Shimano

[11] 4,425,819

[45] Jan. 17, 1984

[54] CONTROL LEVER DEVICE FOR A BICYCLE

[75] Inventor: Keizo Shimano, Sakai, Japan

[73] Assignee: Shimano Industrial Company Limited, Osaka, Japan

[21] Appl. No.: 272,047

[22] Filed: Jun. 9, 1981

[30] Foreign Application Priority Data

Jun. 25, 1980 [JP] Japan .............................. 55-89767[U]
Aug. 8, 1980 [JP] Japan ............................ 55-112888[U]

[51] Int. Cl.³ ........................ B62L 3/02; B62K 23/06; G05G 5/04
[52] U.S. Cl. ......................................... 74/489; 74/526
[58] Field of Search ......................... 74/488, 489, 526

[56] References Cited

U.S. PATENT DOCUMENTS 2,702,657  2/1955  Davis .............................. 74/526 X
4,304,146 12/1981  Ueda ..................................... 74/489

FOREIGN PATENT DOCUMENTS 2434300  1/1976  Fed. Rep. of Germany ........ 74/489
1298725 12/1962  France .
2028411  3/1980  United Kingdom .

Primary Examiner—Allan D. Herrmann
Attorney, Agent, or Firm—Stevens, Davis, Miller & Mosher

[57] ABSTRACT

A control lever device for a bicycle, which supports a control lever to a box-shaped bracket member, the bracket member being provided therein with a rising member extending toward the pivot portion for the lever, so that the lever is pivoted to the rising member, the rising member mounting thereon a grip dimension adjuster which contacts with the lever.

8 Claims, 6 Drawing Figures

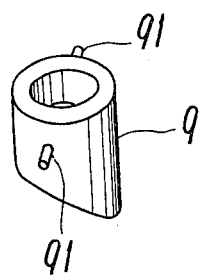
FIG. 4
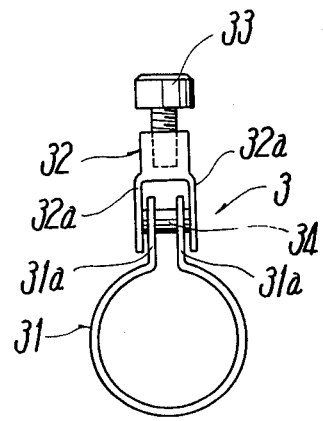
FIG. 5
FIG. 6
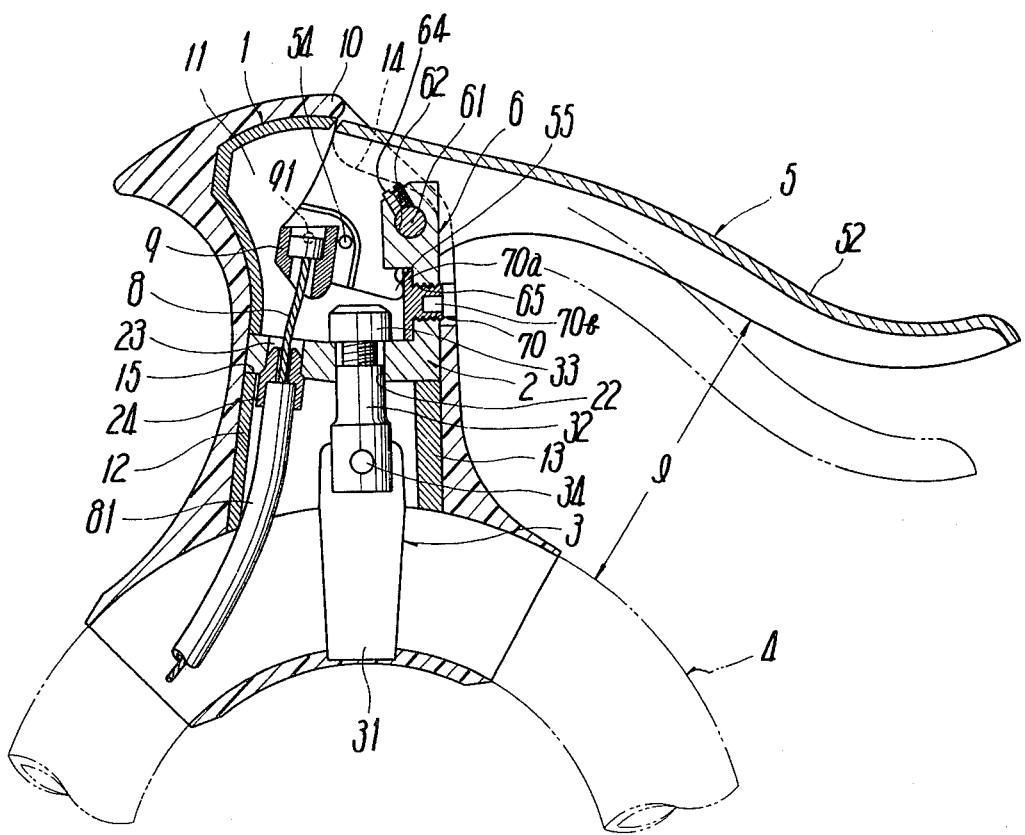

CONTROL LEVER DEVICE FOR A BICYCLE

FIELD OF THE INVENTION

This invention relates to a control lever device mounted on a handle bar at a bicycle, and more particularly to a control lever device comprising a bracket member fixed to the handle bar and a control lever pivoted thereto, the control lever carrying a control wire at one end thereof, so that an operating device, such as a brake, connected to the other end of the wire can be actuated by operation of the lever.

BACKGROUND OF THE INVENTION

Generally, a control lever device for operating the brake is used with a flat type handle bar or a drop type handle bar. The control lever device for the flat type handle bar is mounted thereon in the vicinity of the grip at each end of the handle bar, and that for the drop type handle bar is mounted on each bent portion at the handle bar through a box-like shaped bracket member.

The control lever device, especially for the drop type handle bar, is operated in such a manner that a driver retains his fingers to the grip of the control lever while gripping by his hand the bent portion of the handle bar or the bracket member at the lever device, thereby turning the lever around the pivot point thereof and actuating the operating device.

The fingers of various drivers are different in length due to sex distinction, age or other individual differences, whereby a distance between the handle bar and the grip at the control lever, i.e., a grip dimension, need be changed correspondingly to a size of the driver's hand.

Conventionally, the bracket member has at the front wall thereof a threaded bore, and an adjusting bolt is screwed with the threaded bore and abuts at the tip against a boss of the control lever, the bolt being screwed forward or backward to adjust the grip dimension.

In such construction, the bolt projects at its head from the front wall of the bracket member, so that the control lever device, especially when mounted on the bent portion of the drop type handle, creates the following problem.

The driver, when driving the bicycle of the drop type handle bar, at a middle speed steers the handle gripping the bracket member. Hence, the projecting head of the adjusting bolt catches his palm, which is very dangerous. Also, an air resistance against the bicycle's running increases to an extent of the projecting head.

The adjusting bolt, however, must be mounted on the front wall of the bracket member due to the fact that the lever, in the conventional control lever device, is pivoted to the bracket member at the side walls thereof and in proximity to a side of being mounted to the handle bar.

In detail, the lever is biased unidirectionally by a return spring provided at the operating device, such as the brake, so that the grip dimension may be defined by abutment of the lever against the adjuster through the function of the return sping.

Hence, the adjuster must be provided forwardly in the swinging direction of the lever operated by the return spring.

However, the lever at the conventional device is pivoted to the bracket member in proximity to its mounting side to the handle bar, so that, when the adjuster is provided at the bracket member, the position where the adjuster is to be mounted forwardly in the direction of the swinging motion of the lever by the return spring, is limited to the front wall of the bracket member.

The adjusting bolt requires an allowance of adjustment, and the bracket member, which is made usually from a metallic plate, is smaller in thickness, whereby the adjuster inevitably projects outwardly from the front wall.

It is a remedy for the above that the projected head of the adjuster is made round to avoid the danger of hurting the driver's palm. The head, however, remains projected which is uncomfortable, resulting in driver fatigue and reduced controllability.

SUMMARY OF THE INVENTION

An object of the invention is to provide a control lever device which is capable of facilitating an adjustment of the grip dimension by use of an adjuster which does not projecting from a bracket member, so that a driver, even when gripping the bracket member during the bicycle's running, is free from the danger of hurting his palms and becomes less fatigued, thus improving safety and steerability.

The control lever device of the invention comprises a box-shaped bracket member having an opening at the rear side and a control lever pivoted to the bracket member, and is characterized in that the control lever is pivoted to the top of a rising member which is provided at the bracket member and extends toward the opening, the rising member carrying an adjuster which has a control portion and a contact portion to contact with the lever.

The rising member may be integral with the bracket member, but is mounted on an adapter separate from the bracket member. Since the rising member is provided at the adapter and pivotally supports at the top the control lever, the adjuster is mountable on the rising member without projecting outwardly from the front wall of the bracket member in contrast with the aforesaid conventional device. Hence, the driver, even when gripping the bracket member to drive the bicycle, is never hurt and becomes less fatigued, thus improving the his operation of the bicycle.

Also, the control lever is pivoted to the rising member, so that the adjuster can be mounted thereon and adjacently to the pivot portion for the lever, thereby increasing a degree of freedom for a design of the lever device to that extent.

These and other objects of the invention will become more apparent in the detailed description and examples which follow.

BRIEF DESCRIPTION OF THE DRAWINGS

FIG. 4 is a perspective view of a retainer for a control wire, FIg. 5 is a front view of a fixing means for a bracket shown in FIG. 1, and FIG. 6 is a sectional view of a modified embodiment of the invention, corresponding to FIG. 1.

DETAILED DESCRIPTION OF THE INVENTION

Figure 1:
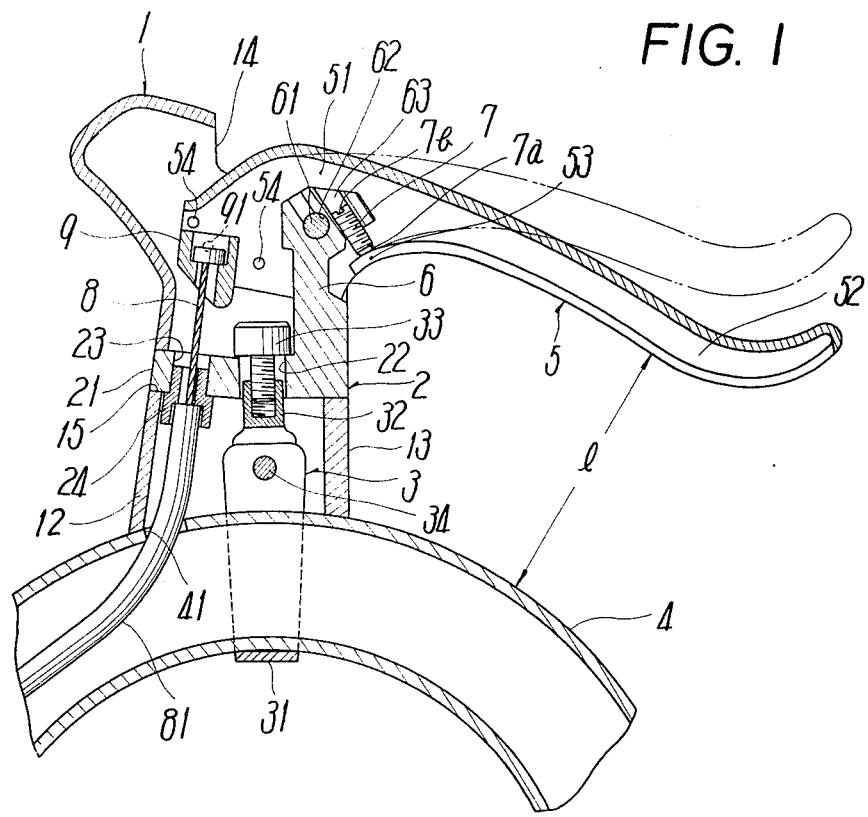
FIG. 1 is a sectional view of an embodiment of a control lever device of the invention in condition of being mounted on a handle bar.

Referring to the drawings, a control lever device is used with a drop type handle bar 4 and comprises a box-shaped bracket member 1, an adapter 2, a fixing means 3 for fixing the bracket member 1 to the handle bar 4, and a control lever 5.

The bracket member 1 comprises a pair of side walls 11 opposite to each other, and a front wall 12 and a rear wall 13 which connect the side walls 11, the rear wall 13 being smaller in height than the front wall 12 and having an opening 14 rearward of bracket member 1, the front wall 12 having at a position level with the upper end of rear wall 13 a bore 15 for retaining therein a retaining nose 21 at adapter 2.

The adapter 2 is disposed longitudinally of bracket member 1, mounted across the front wall 12 and rear wall 13, and is provided at a side of rear wall 13 with a rising member 6, the principal portion of the invention.

Figure 3:
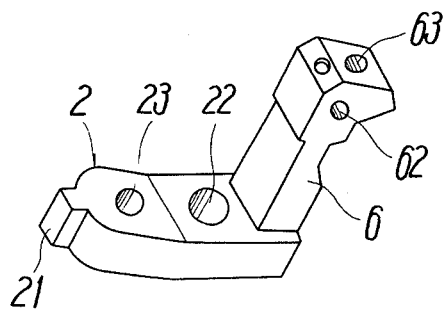
FIG. 3 is a perspective view of an adapter.

In detail, the adapter 2, as shown in FIGS. 1 and 3, is L-like shaped and has at the front end the aforesaid retaining nose 21. The nose 21 is insertably retained to bore 15 at front wall 12 and the rear end of adapter 2 is retained on the upper end of rear wall 13, so that the adapter 2 is mounted across the front wall 12 and rear wall 13. Furthermore, at the adapter 2 are formed a bore 22 inserted with a mounting bolt 33 constituting the fixing means 3, and a bore 23 which holds a support 24 for an outer sheath or guide 81 to be hereinafter described.

The fixing means 3 secures the bracket member 1 to handle bar 4 through adapter 2 as follows:

The fixing means 3, as shown in FIG. 5, comprises an annular tightening band 31 having at both ends thereof lugs 31a, a tubular mounting nut 32 having a pair of legs 32a, and the mounting bolt 33. The band 31 is sleeved onto handle bar 4, the lugs 31a are inserted between the legs 32a, the legs 32a are connected by a pin 34, and the bolt 33 is inserted into bore 22 and screwed with nut 32, whereby the bracket member 1 is fixed to handle bar 4 and simultaneously the adapter 2 is secured to bracket member 1.

Figure 2:
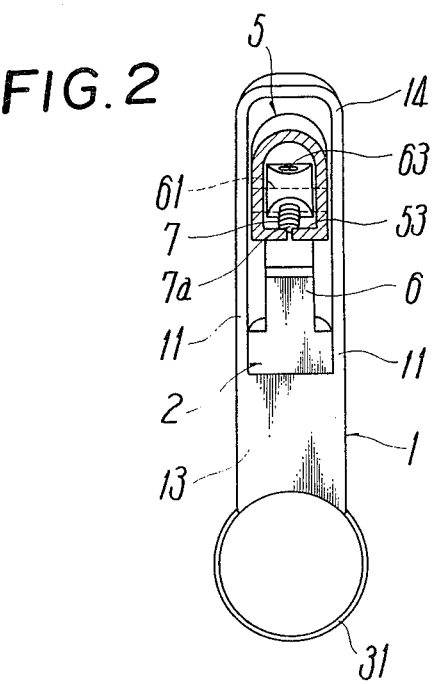
FIG. 2 is a sectional rear view of a control lever only.

The control lever 5, as shown in FIG. 1, comprises a boss 51 and a grip 52 and formed of a metallic plate bent by a press or the like, the boss 51 being formed in an inverted-U-like shape in section and the grip 52 in a closed-box-shape in section as shown in FIG. 2. The lever 5 is inserted at its boss 51 into bracket member 1 through opening 14 thereat, the boss 51 being pivoted to the top of rising member 6 at adapter 2 by use of a lever shaft 61 inserted into a shaft bore 62 at rising member 6 as shown in FIG. 3.

At the top of rising member 6 is formed a threaded bore 63 extending at an right angle with bore 62, in other words, in the direction of swinging motion of lever 5, so that the threaded bore 63 is screwed with an adjusting bolt or adjuster 7 having a contact portion 7a and a control portion 7b. The grip 52 is provided at its root adjacent to boss 51 with a stopper 53 opposite to rising member 6, so that the contact portion 7a abuts against stopper 53 to restrict the lever 5 in position with respect to handle bar 4.

In addition, the stopper 53 in FIG. 1 is formed by utilizing the inwardly bent portions of grip 52 of a closed-box-shape in section as shown in FIG. 2.

A retainer 9 for control wire 8 is supported swingably through a pair of pins 91 to the utmost end of boss 51 at lever 5 inserted into bracket member 1, the pins 91 projecting outwardly from the outer surface of retainer 9 as shown in FIG. 4.

In FIG. 1, a guide 81 comprising an outer sheath which guides the control wire 8, is insertably supported through support 24 to bore 23 at adapter 2, and extends into handle bar 4 through a bore 41 thereat. Pins 54 are formed at boss 51 of lever 5 and restrict a range of swinging motion of retainer 9.

The control lever device of the invention constructed as abovementioned allows adjustment a grip dimension, i.e., a distance 1 between the grip 52 and the handle bar 4, by permitting a screwable adjustment of adjusting bolt 7 forward or backward corresponding to a size of a driver's hand.

In detail, the bolt 7 is screwed forward to urge the stopper 53 at lever 5, thereby moving the grip 52 thereof toward handle bar 4 to reduce the grip dimension 1. While, the bolt 7 is screwed backward to release the stopper 53, thereby moving the grip 52 away from handle bar 4 to increase the grip dimension 1 as shown by the phantom line in FIG. 1.

When the grip 52 is moved, the retainer 9 for control wire 8, which is supported swingably to boss 51, keeps the control wire 8 always straight with respect to guide 81 supported to adapter 2 through support 24, so that the control lever 5 always operates normally regardless of the adjustment of grip dimension 1.

As seen from the above, the control lever device of the invention can change the grip eimension readily in an optimum condition corresponding to the driver through the adjustment of adjuster, such as adjusting bolt 7, and is arranged so the adjuster does not project outwardly from the front wall of the bracket member but is instead housed therein, so that the air resistance against the bicycle running is reduced to that extent. Furthermore, the device of the invention, even when used with a drop type handle bar often gripped by a driver, does not permit the driver to catch his palm by the adjuster.

The aforesaid embodiment cannot adjust the adjusting bolt 7 without removing the lever 5 from adapter 2 due to the fact that the bolt 7 is screwed with the top of rising member 6 and extends toward stopper 53 at the lower side of lever 5. Alternatively, a construction shown in FIG. 6 can adjust the grip dimension with ease from the outside of bracket member 1.

In FIG. 6, a threaded through bore 65 is provided at the root of rising member 6, and an adjuster 70 having a contact portion 70a and a control portion 70b, is screwed with bore 65 from the inside thereof. At the boss 51 of lever 5 is provided a stopper 55 directed towards the inner surface of rising member 6 and the control portion 70b is exposed outwardly from adapter 2, thereby making the adjuster 70 controllable from the outside.

In addition, the adjuster 70 comprises a headed screw bolt having at the threaded portion thereof the control portion 70b of a hexagonal bore and at the head the contact portion 70a.

The contact portion 70a of adjuster 70 is opposite to the head of mounting bolt 33, so that an interval between the opposite heads of adjuster 70 and bolt 33, is made smaller than an axial length of screw thread at adjuster 70 to thereby prevent the adjuster 70 from escaping from threaded bore 65.

In the embodiment in FIG. 6, the bracket member 1 is provided with a bracket cover 10 of a soft material, formed to provide an easy grip, and covering the outer surfaces of side walls 11, front wall 12 and rear wall 13, of bracket member 1.

As seen from the above, in the embodiment of FIG. 6 the control portion 70b at adjuster 70 can be operated from the outside of bracket member 1, whereby the grip dimension is readily changeable from the outside of the same. Furthermore, since the adjuster 70 is housed within bracket member 1, there is no fear at all that the driver, when gripping bracket member 1 to drive the bicycle, is caught at his palm by adjuster 70, thereby improving safety in the bicycle's running.

As also shown in FIG. 6, a set screw 64 is associated with lever shaft 61 and is provided for fixing the lever shaft 61 to the rising member 6.

Although several embodiments have been described, they are merely exemplary of the invention and not to be constructed as limiting, the invention being defined solely by the appended claims.

What is claimed is:

1. A control lever device mounted on a handle bar of a bicycle and comprising:
    a bracket member having a fixing means for fixing said bracket member to said handle bar, said bracket member having a front wall, side walls and a rear wall, being formed in a box-like shape having an opening at a rear side thereof, and having a rising member extending toward said opening;
    a control lever mounted pivotally on the top of said rising member and having a boss and a grip portion, said boss being inserted at its utmost end into said bracket member through said opening, and having at said utmost end a retainer for a control wire, said grip portion being opposite to said handle bar; and
    an adjuster mounted on said rising member for adjusting a distance between said grip portion and said handle bar, said adjuster having a contact portion which contacts with said control lever and a control portion for moving said adjuster, said contact portion contacting with said control lever to restrict the distance between said grip portion and said handle bar.

2. A control lever device for a bicycle according to claim 1, wherein said rising member is provided at an adapter separate from said bracket member.

3. A control lever device for a bicycle according to claim 2, wherein said adapter is disposed longitudinally of said bracket member, is mounted across said front and rear walls, and has said rising member at a side of said rear wall, said adapter holding said fixing means for said bracket member to said handle bar, so that said fixing means fixes said bracket member to said handle bar and also said adapter to said bracket member.

4. A control lever device for a bicycle according to claim 3, wherein said adapter has a guide for guiding toward said handle bar said control wire retained to said retainer at said control lever.

5. A control lever device for a bicycle according to claim 4, wherein said guide is an outer sheath.

6. A control lever device for a bicycle according to claim 1, wherein a stopper opposite to the top of said rising member is provided at the base of said grip portion of said control lever at a side of said boss, said adjuster being provided at the top of said rising member.

7. A control lever device for a bicycle according to claim 1, wherein said boss at said control lever has a stopper directed towards the inner surface of said rising member, said adjuster being disposed at the inside of said rising member and mounted thereon, said control portion projecting through said rising member to be exposed at the outer surface thereof, thereby being operable from the outside of said bracket member.

8. A control lever device for a bicycle according to claim 1, wherein said bracket member includes at the outer surface thereof a bracket cover made from a soft material.

* * * * *